United States Patent [19]

Tomizawa et al.

[11] Patent Number: 4,841,394
[45] Date of Patent: Jun. 20, 1989

[54] COVER MECHANISM FOR A RECORDING MEDIUM HOLDING DEVICE

[75] Inventors: Youzi Tomizawa, Yokohama; Masashi Mizutani, Kawasaki, both of Japan

[73] Assignee: Alps Electric Co., Ltd., Japan

[21] Appl. No.: 90,613

[22] Filed: Aug. 28, 1987

[30] Foreign Application Priority Data

Oct. 31, 1986 [JP] Japan .................. 61-167560[U]

[51] Int. Cl.⁴ ............... G11B 17/04; G11B 17/032; G11B 17/03
[52] U.S. Cl. ................ 360/99.06; 360/99.02; 360/96.5
[58] Field of Search .................. 360/97–99, 360/99.06, 99.02, 96.5, 96.6

[56] References Cited

U.S. PATENT DOCUMENTS

| | | | |
|---|---|---|---|
| 4,412,260 | 10/1983 | Stricklin et al. | 360/97 |
| 4,481,552 | 11/1984 | Dona et al. | 360/97 |
| 4,504,879 | 3/1985 | Toldi et al. | 360/97 |
| 4,683,506 | 7/1987 | Toldi et al. | 360/97 |
| 4,722,012 | 1/1988 | Toldi et al. | 360/97 |
| 4,727,444 | 2/1988 | Fukushima et al. | 360/97 |

FOREIGN PATENT DOCUMENTS 59-79465  5/1984  Japan .................. 360/99

*Primary Examiner*—John H. Wolff
*Assistant Examiner*—Matthew J. Bussan
*Attorney, Agent, or Firm*—Guy W. Shoup; Paul J. Winters; Stephen L. Malaska

[57] ABSTRACT

A device for holding a recording medium includes a casing having a front end, a rear end and a pair of sidewalls each provided with a hole at its bottom adjacent to the front end of the casing. A cover is rotatably provided at the front end of the casing and includes a pair of sidewalls located in parallel to the sidewalls of the casing. Each sidewall of the cover has a laterally projecting pin fitted in the hole of one of the casing sidewalls and an elongated hole lying in a line passing through the axis of the pin at right angles thereto. A pair of transversely spaced apart parallel sliding levers are provided within the casing immediately inwardly of its sidewalls, respectively. Each sidewall of the cover is situated between one of the levers and one of the casing sidewalls. Each lever has an upwardly bent and forwardly inclined front end provided with a laterally projecting pin fitted in the elongated hole of one of the sidewalls of the cover. The levers are slidable along the sidewalls of the casing for rotating the cover about its pins. The cover temporarily stops at a half open position before it can be rotated to its fully open position.

2 Claims, 3 Drawing Sheets

COVER MECHANISM FOR A RECORDING MEDIUM HOLDING DEVICE

BACKGROUND OF THE INVENTION

1. Field of the Invention

This invention relates to a cover mechanism for a device for holding a recording medium, especially a hard disk containing a driving mechanism and having a relatively large weight.

2. Description of the Prior Art

There is known a recording medium holding device containing a driving motor for opening a cover to eject a recording medium automatically. The device is, however, undesirably large and expensive, as it contains the motor and requires a relatively large space for its installation. Moreover, the cover is movable only between its fully open position and its fully closed position and the recording medium is ejected immediately when the cover has been fully opened. As a consequence, it sometimes fails to support the weight of the medium which has been ejected and there is every likelihood that the medium may be brought into striking contact with any object situated in its neighborhood.

SUMMARY OF THE INVENTION

It is, therefore, an object of this invention to provide a recording medium holding device including a cover which has a half open position to warn the user of the device against any possible accident caused by a heavy recording medium, and which can be opened without the aid of any driving motor to enable a reduction in the size and cost of the device.

This object is essentially attained by a device comprising a casing having a front end, a rear end and a pair of sidewalls each provided with a hole at its bottom adjacent to the front end of the casing, a cover provided rotatably at the front end of the casing and including a pair of sidewalls located in parallel to the sidewalls, respectively, of the casing and each having a laterally projecting pin fitted in the hole of one of the sidewalls of the casing and an elongated hole lying in a line passing through the axis of the pin at right angles thereto, and a pair of transversely spaced apart parallel sliding levers provided within the casing immediately inwardly of its sidewalls, respectively, each sidewall of the cover being situated between one of the levers and one of the sidewalls of the casing, each lever having an upwardly bent and forwardly inclined front end provided with a laterally projecting pin fitted in the elongated hole of one of the sidewalls of the cover, the levers being slidable along the sidewalls of the casing for rotating the cover about its pins.

When the cover is opened for the ejection of a recording medium, it is not moved directly from its closed position to its fully open position, but temporarily stops at its half open position. Therefore, the user of the device can be careful enough to prevent any impactive ejection of the recording medium. The sliding levers are provided for opening the cover. No motor is required any longer. Therefore, the device can be correspondingly reduced in size and can be manufactured at a correspondingly lower cost.

DETAILED DESCRIPTION OF THE INVENTION

Figure 1:
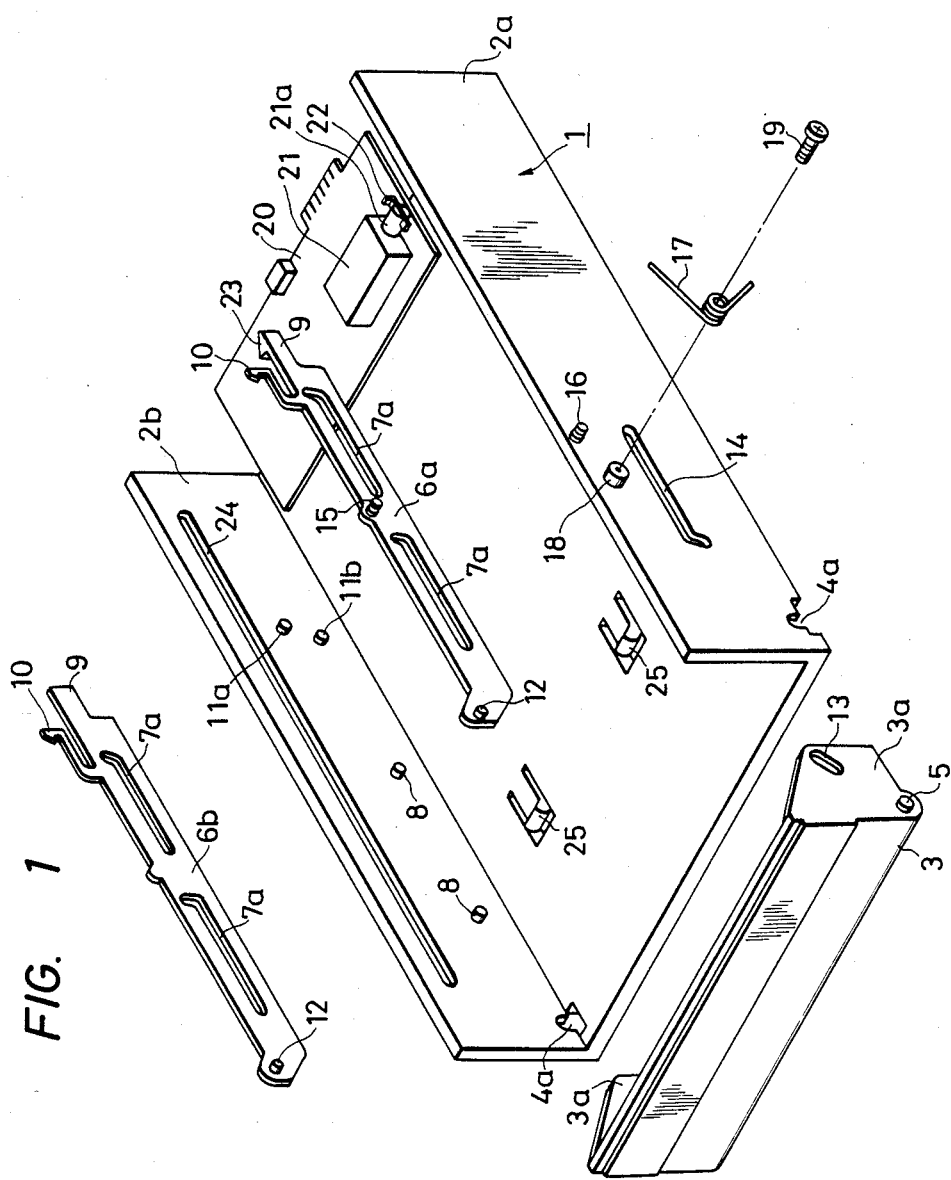
FIG. 1 is an exploded perspective view of a device embodying this invention.
Figure 2:
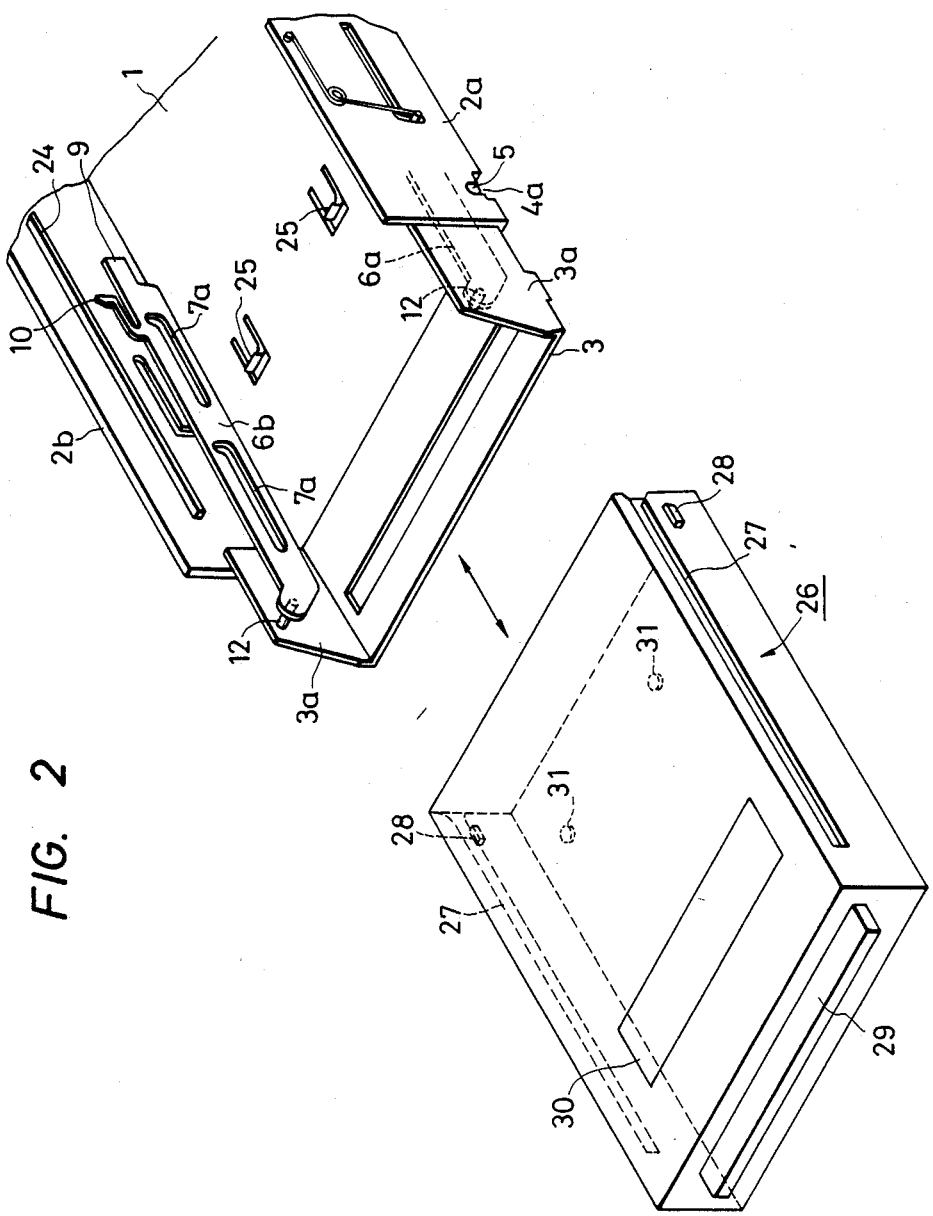
FIG. 2 is a fragmentary perspective view of the device with its cover opened and a recording medium which has been removed therefrom.
Figure 3:
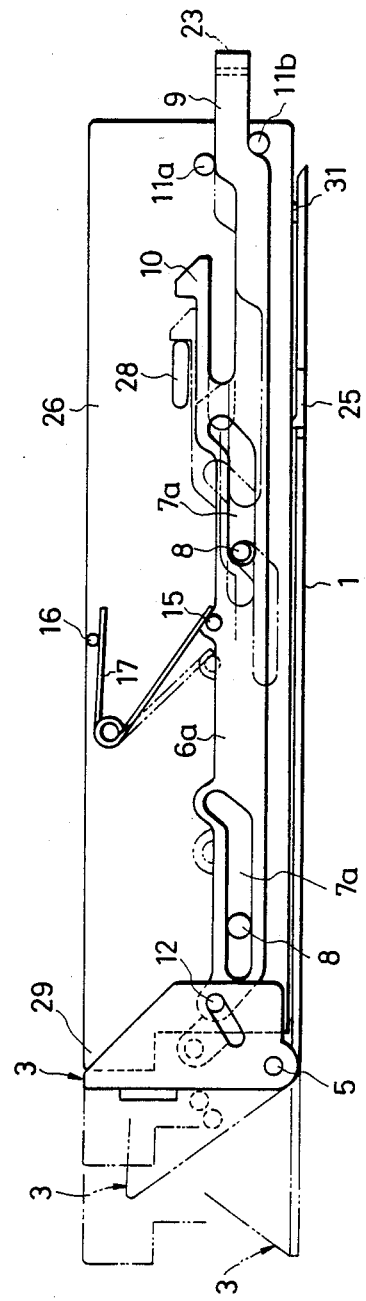
FIG. 3 is a side elevational view of the device with the recording medium mounted therein illustrating the movement of its cover and associated mechanism.

A recording medium holding device embodying this invention is shown by way of example in FIGS. 1 to 3. The device includes a casing 1 formed from a metal or plastic material. The casing 1 has a pair of sidewalls 2a and 2b extending between its front and rear ends. The casing 1 has a pair of holes 4a provided adjacent to its front end and at the bottom of its sidewalls 2a and 2b, respectively. A cover 3 is rotatably supported at the front end of the casing 1. The cover 3 has a pair of sidewalls 3a located in parallel to the sidewalls of the casing 1. Each sidewall 3a is provided adjacent to one of its bottom corners with a laterally projecting pin 5 fitted in the hole 4a of one of the sidewalls of the casing 1. Each sidewall 3a also has an elongated hole 13 provided adjacent to one of its top corners which is located diagonally with respect to the pin 5. The hole 13 lies in a line passing through the axis of the pin 5 at right angles thereto and is inclined to the horizontal when the cover 3 is in its fully closed position as shown in FIG. 1. The cover 3 is rotatable about its pins 5.

A pair of transversely spaced apart parallel sliding levers 6a and 6b are horizontally disposed in the casing 1. Each sidewall 3a of the cover 3 is disposed between one of the sidewalls of the casing 1 and one of the levers 6a and 6b. Each lever is provided with a pair of longitudinally extending guide slots 7a each having an upwardly directed and tapered rear end. Each sidewall of the casing has a pair of guide pins 8 projecting laterally from its inner surface into the slots 7a, respectively, of one of the levers. Each lever is provided at its rear end with a guide projection 9 of reduced width defined by a bottom shoulder and a sliding hook 10 spaced above the guide projection 9 and extending in parallel thereto. The hook 10 has an upwardly bent end. Each sidewall of the casing 1 is provided between its rear end and the guide pins 8 with a pair of hook guide pins 11a and 11b projecting laterally from its inner surface and located one above the other in a line inclined to the vertical. The guide projection 9 of one of the levers is disposed between the hook guide pins 11a and 11b. Each lever has an upwardly bent and forwardly inclined front end provided adjacent to its top with a laterally projecting pin 12 fitted in the elongated hole 13 of one of the sidewalls 3a of the cover 3, so that the cover 3 may be rotatable with the movement of the sliding levers 6a and 6b.

The sidewall 2a of the casing 1 has a horizontal slot 14 provided closer to its front end than to its rear end. The slot 14 has a downwardly and forwardly bent front end. The sliding lever 6a has a spring holding pin 15 projecting laterally from its middle portion and fitted in the slot 14. The sidewall 2a has a spring holding pin 16 projecting laterally from its outer surface above the slot 14. A substantially L-shaped spring 17 has a pair of legs held by the pins 15 and 16, respectively, and a coiled middle portion fastened by a screw 19 to a spring mount 18 on the outer surface of the sidewall 2a of the casing 1. The spring 17 urges forwardly the sliding lever 6a and thereby the sliding lever 6b and the cover 3.

A control base 20 carrying a solenoid 21 thereon is provided at the rear end of the casing 1. The solenoid 21 has a solenoid pin 21a provided with a lock pawl 22. The guide projection 9 of the sliding lever 6a has a pawl 23 projecting laterally from its rear end. The lock pawl 22 is engageable with the pawl 23 for holding a hard disk in position within the casing 1 by overcoming the forwardly urging force of the spring 17.

The casing 1 has a pair of horizontal disk guide ridges 24 provided on the inner surfaces of its sidewalls 2a and 2b, respectively. The casing 1 also has a pair of transversely spaced apart pawls 25 cut from its bottom wall and each having an upwardly and forwardly bent end. The pawls 25 make a click when a hard disk is removed from the casing, while allowing its smooth insertion.

Referring now to FIG. 2, a hard disk is generally shown at 26. It may be a 3.5 inch disk containing a driving mechanism and having a relatively large weight. The disk 26 has a pair of sidewalls each provided along its upper edge with a groove 27 extending horizontally from its rear end to nearly its front end. A projection 28 is provided below each groove 27 adjacent to the rear end of the disk 26. Each ridge 24 can fit in one of the grooves 27 when the disk 26 is inserted into the casing 1. Each projection 28 abuts on one of the hooks 10 when the cover 3 is closed after the disk 26 has been inserted into the casing 1. The disk 26 is provided at its front end with a handle 29 which is used for drawing the disk 26. The disk 26 also has near its front end a top wall portion 30 to which a label containing a caution message can be affixed. A pair of transversely spaced apart semispherical projections 31 are provided in the lower bottom surface of the disk 26. The projections 31 are slidable past the pawls 25, respectively, at the bottom of the casing 1 when the disk 26 is removed from the casing 1, so that the pawls 25 may make a click on that occasion.

Attention is now directed to FIG. 3 showing the disk 26 held in the casing 1 with the cover 3 closed for protecting it. The lock pawl 22 on the solenoid 21 is engaged with the pawl 23 on the sliding lever 6a to lock it against any forward movement and thereby hold the disk 26 within the casing 1 despite the urging force of the spring 17. This engagement is broken when the pin 21a is drawn into the solenoid 21 by an input from an external switch not shown, etc. upon termination or interruption of an access. As soon as the pin 21a is retracted into the solenoid 21, thus disengaging the sliding levers, the sliding levers 6a and 6b are caused by the spring 17 to move forward. The sliding levers continue to move forward and stop when the hooks 10 abut on the projections 28 of the disk 26 the forward movement of the sliding levers causes pins 12 to push the cover 3 forward until the cover 3 is rotated to its half open position. The user of the device can now put his hand on the cover 3 and rotate it to its horizontal or fully open position. As a result, the disk 26 is moved more forwardly. If he grips the handle 29 and pulls the disk 26, its projections 31 move over the pawls 25 of the casing 1 and cause them to make a click. He can now read the caution message on the label affixed to the top wall portion 30 of the disk 26 and be careful enough to prevent any impactive ejection of the disk 26.

It is effective to provide the surfaces of the disk 26 adjacent to its front end with a plurality of slipproof dimples to prevent any impactive ejection thereof, though no such dimple is shown in the drawings. It is also effective to form the cover 3 wholly or partly from a transparent material to enable the disk 26, etc. in the device to be seen herethrough.

What is claimed is:

1. A recording medium holding device comprising:

a casing having a front end, a rear end, and a pair of sidewalls each of said sidewalls defining a hole at the bottom thereof adjacent to said front end, said sidewalls provided with a plurality of guide pins projecting inward;

cover pivotally provided at said front end of said casing and having a pair of sidewalls, each of said cover sidewalls having a laterally projecting pin movably received by said hole of one of said casing sidewalls, said cover sidewalls further defining an oblong hole;

a pair of transversely spaced parallel sliding levers slidably mounted to the inner side of said casing sidewalls said levers defining longitudinally extending guide slots for movably receiving said guide pins of said casing sidewalls, said sliding levers each having an upwardly bent and forwardly inclined front end provided with a laterally projecting pin movably received by said oblong hole of said cover sidewall, said levers each further having a sliding hook and a guide projection disposed at the rear end of said levers;

a resilient member for biasing one of said sliding levers toward said front end of said casing;

a solenoid having a lock claw selectively engaged with an engaging claw formed in a said guide projection of a said lever for holding said sliding lever against the biasing force of said resilient member;

whereby, upon operation, said lock claw disengages said engaging claw of said guide projection and said resilient member biases said sliding levers toward said front end of said casing such that said sliding hook cooperates with a projection formed on a recording medium to move said recording medium toward said front end of said casing.

2. A device as set forth in claim 1, wherein said resilient member moves said one sliding lever toward said front end of said casing for opening said cover halfway and temporarily stops when said sliding hook contacts said projection on said recording medium.

* * * * *